May 19, 1953  A. W. BIRT ET AL  2,639,393
MOUNTING AND HOLDER FOR PIEZOELECTRIC CRYSTALS
Filed March 3, 1949
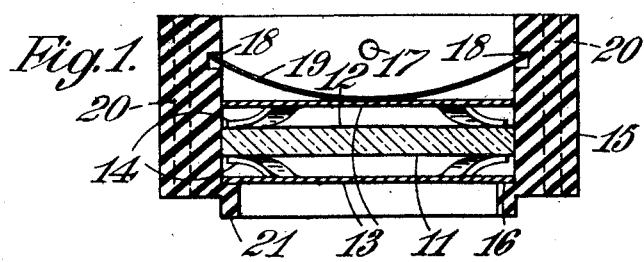
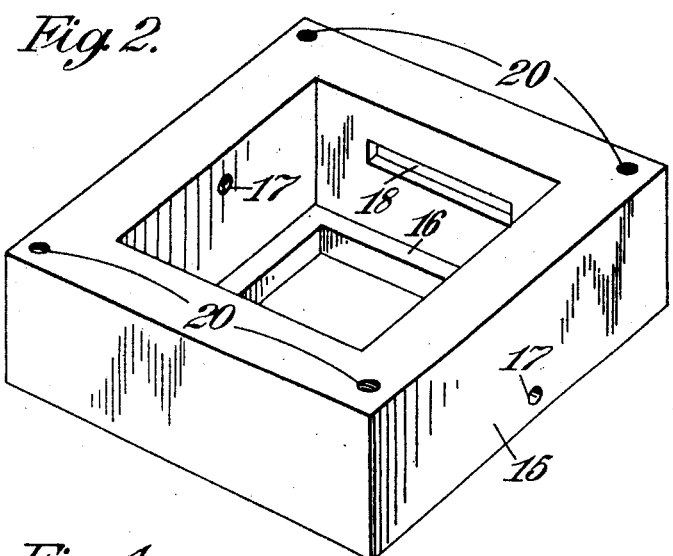
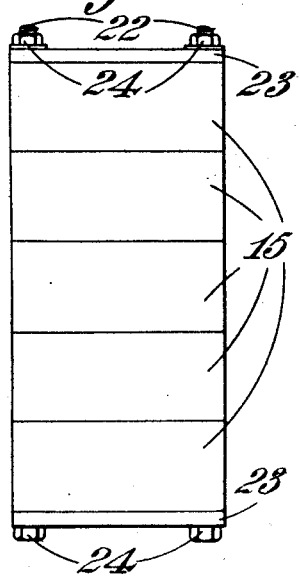
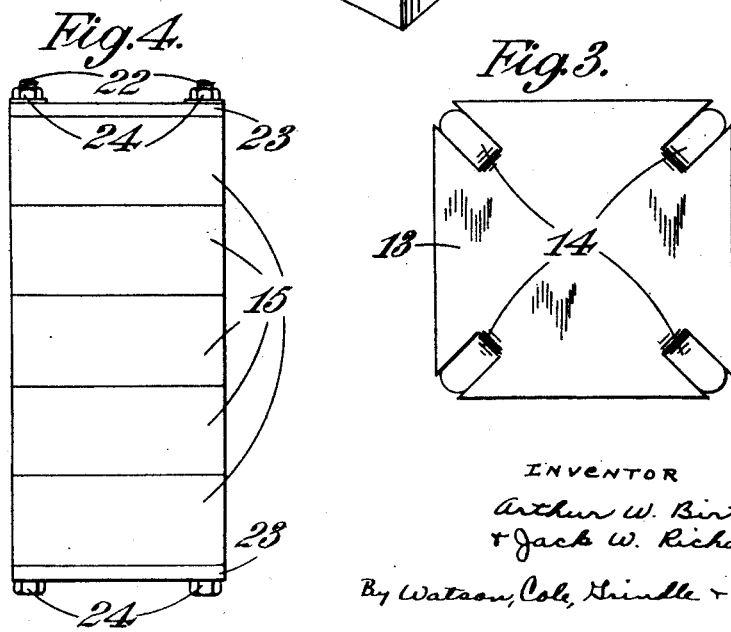
INVENTOR
Arthur W. Birt
& Jack W. Richardson
By Watson, Cole, Grindle & Watson

UNITED STATES PATENT OFFICE 2,639,393

MOUNTING AND HOLDER FOR PIEZO-ELECTRIC CRYSTALS

Arthur William Birt, Kings Langley, and Jack Wilson Richardson, Watford, England, assignors to Piezo Crystals Limited, Redhill, Surrey, England, a British company Application March 3, 1949, Serial No. 79,342
In Great Britain February 26, 1948

2 Claims. (Cl. 310—9.2)

One object of this invention is to enable a plurality of piezo-electric crystals to be mounted in apparatus employing them, in a manner which is economical of space and weight.

Another object of this invention is to provide an arrangement of holder which can easily be modified to accommodate various numbers of piezo-electric crystals.

Another object of this invention is to provide an arrangement of holder for a plurality of piezo-electric crystals from which any one of the crystals can easily be removed and another substituted in its place.

Another object of this invention is to provide a holder for a plurality of piezo-electric crystals from which one crystal can be removed and another substituted without great disturbance to the other crystals of the holder.

Another object of this invention is to provide a holder for a plurality of piezo-electric crystals which can be assembled easily without damaging the crystals.

In order that these and other objects of the invention may be more readily appreciated, one embodiment of the invention will now be described, reference being had to the accompanying drawings of which:

Figure 1 is a section through a piezo-electric crystal mounted in its frame;

Figure 2 is a perspective view of a frame;

Figure 3 is a plan view of a contact plate;

Figure 4 is an elevation of a holder for a plurality of piezo-electric crystals.

Each crystal 10 is a square plate and has metallic electrodes 11, 12 sputtered or evaporated onto its major surfaces. It is clamped between two square silver-coated Phosphor bronze or other metallic contact-plates 13, which each have offset tongues 14 on their four corners to engage the corners of the major surfaces of the crystal 10, which can thus be clamped between the two contact-plates 12 by engagement at the corners only.

The crystal and contact-plates are inserted into a square frame 15 moulded from synthetic resin. The frame is open at one transverse face and receives the assembly snugly, but at the opposite face it is provided with an inturned flange 16 against which one of the contact-plates abuts.

The frame has a pair of holes 17 bored through opposite walls and spaced apart axially, through which a pair of conductors are led to be soldered to the two contact-plates 13.

The frame also has a pair of slots 18 situated in the internal faces of the remaining two walls, which receive the ends of a single leaf-spring 19. The leaf-spring 19 is inserted into the frame diagonally and is rotated so that the ends enter the slots, and, at the same time, the spring 19 is distorted to come into engagement between its ends with one of the contact-plates 13 and thus to provide a load opposed by the flange 16 of the frame 15, so that the crystal-plate 10 is clamped between the two contact-plates 13.

The frame 15 is provided with axial holes 20 bored through it at each of its corners and with an axial projection 21 running round the internal edge of the outside face of the flange 16. The projection 21 has the same external dimensions as the internal dimensions of the frame 15 at the open end.

The holder (Figure 3) is made up by threading onto four lengths of studding 22, the required number of separate crystal-plates each mounted in its separate frame 15; the axial projection of one frame being received into the open face of the frame of an adjacent mounting and the studding 22 passing through the axial holes 20 in the four corners of each frame.

The stack of crystal mountings has a cover-plate 23, which is a square plate with a hole in each corner and a recess to receive the projection 21 of a frame 15, mounted on the studding at either end, and is then clamped by nuts 24 screwed on the ends of the studding 22. Only one of the two cover plates will actually receive a projection of a frame.

It will be appreciated that many departures could be made from the above embodiment without departing from the invention. For instance, the embodiment has been described with relation to square high frequency shear thickness-mode crystals having gold or other metallic electrodes and Phosphor bronze silver-coated or other metallic contact plates, but the invention is equally applicable to other kinds of crystals and contact plates.

It will be appreciated that each of the crystals in the above described embodiment of the invention is mounted separately, and the mounting provides adequate protection for the crystal against external shock or vibration. However the mounting is light and is very economical of space and can readily be assembled with other similar mountings into a stack or block of good mechanical strength.

It will also be appreciated that the crystal-mountings stacked in one holder can readily be substituted for or added to those stacked in another holder.

Once a holder has been assembled it can be mounted in the apparatus as a single component; for instance it could be mounted in a crystal-oven in the apparatus so that, in operation, all the crystals in one holder could be operated at the same steady temperature.

We claim:

1. A mounting for a plate-like piezo-electric crystal comprising an open rectangular frame made of insulating material, an inwardly directed flange in the opening of said frame, telescoping means extending from said flange to telescope into the opening of a frame similar to said frame, a pair of slots in said frame one in each of two of its inwardly facing surfaces, a single leaf compression spring arranged with its ends abutting said slots, a first contact-plate engaging said spring at a point intermediate the ends of said spring, a crystal-plate, a second contact-plate abutting said flange, said first and second contact plates being of the same size as said crystal plate and having offset tongues, one at each corner, to engage said crystal plate; said spring, first contact-plate, crystal plate and second contact plate being arranged in compression between said slots and said flange.

2. A mounting for a plate-like piezo-electric crystal comprising an open rectangular frame made of insulating material, an abutment on said frame, a pair of slots one in each of two of the inwardly facing surfaces of said frame and spaced apart from and on the same side of said abutment, a crystal-plate and a contact plate, a leaf spring arranged with its ends abutting said slots and arranged to engage said contact-plate at a point intermediate its ends whereby said crystal-plate and contact plate are compressed between said spring and said abutment with said contact-plate engaging said crystal-plate.

ARTHUR WILLIAM BIRT.
JACK WILSON RICHARDSON.

References Cited in the file of this patent

UNITED STATES PATENTS

| Number | Name | Date |
|---|---|---|
| 1,683,091 | Mirick | Sept. 4, 1928 |
| 2,293,485 | Baldwin | Aug. 18, 1942 |
| 2,327,487 | Bach | Aug. 24, 1943 |
| 2,458,987 | Fruth | Jan. 11, 1949 |

FOREIGN PATENTS

| Number | Country | Date |
|---|---|---|
| 647,431 | Great Britain | Dec. 13, 1950 |